May 22, 1951
J. S. SWEARINGEN
2,554,428
DISTILLATION TOWER
Filed Nov. 26, 1946
2 Sheets-Sheet 1
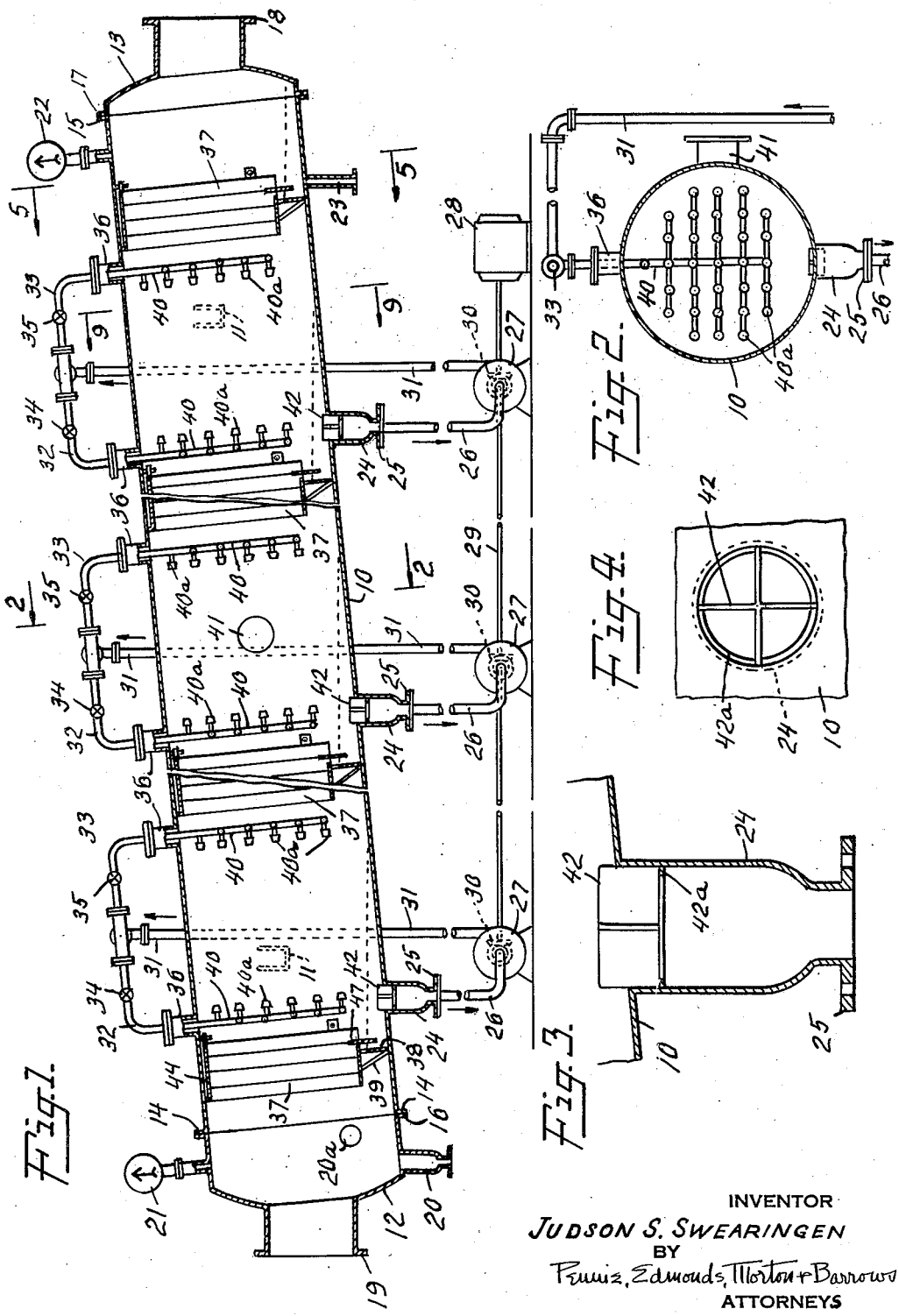
INVENTOR
JUDSON S. SWEARINGEN
BY
Pennie, Edmonds, Morton + Barrows
ATTORNEYS

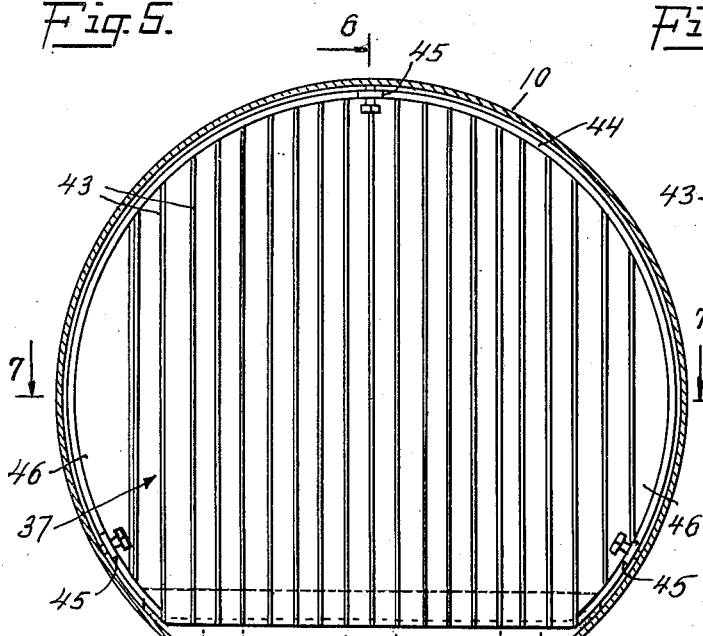
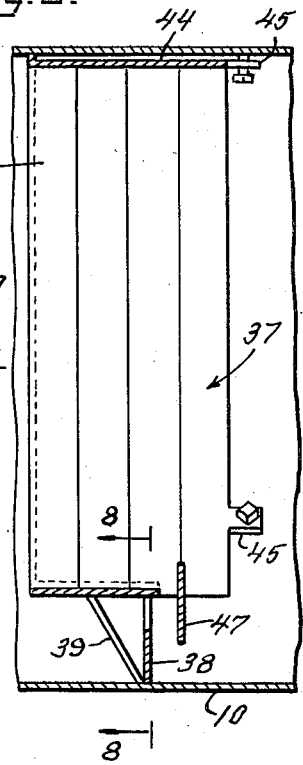
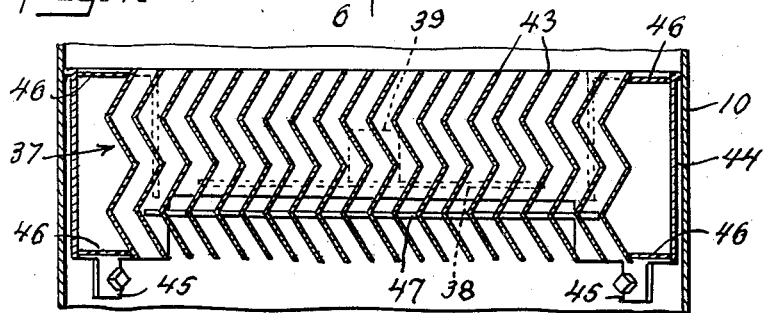
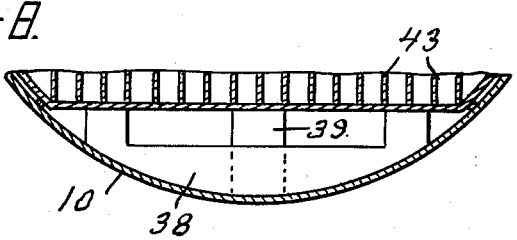
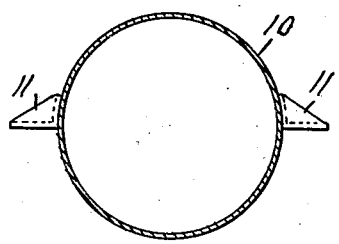

Patented May 22, 1951

2,554,428

UNITED STATES PATENT OFFICE 2,554,428

DISTILLATION TOWER

Judson S. Swearingen, New York, N. Y., assignor to Mathieson Chemical Corporation, a corporation of Virginia Application November 26, 1946, Serial No. 712,297

1 Claim. (Cl. 261—36)

My invention relates to fractional distillation and more especially pertains to a novel distillation vessel particularly adapted for use in distillations carried out under reduced pressure.

Many distillation operations must be effected under reduced pressure in order to prevent decomposition of the material being worked. In other cases, reduced pressure is necessary in order to avoid polymerization of the material. Thus, in the distillation of heat-sensitive monomers, such as dichlorostyrenes, from reaction mixtures containing the same, unless the distillation is conducted at reduced pressure, loss of material through polymerization may be considerable, even though a polymerization inhibitor is used. Apart from the loss of material, polymerization of heat polymerizable monomers during distillation is undesirable as frequently resulting in damage to the equipment through plugging of valves, pumps, lines, etc. with polymer.

In the case of most heat polymerizable monomers the rate of polymerization is substantially directed proportional to the pressure prevailing in the distillation vessel. Hence, the lower the absolute pressure, the less the rate and amount of polymerization. In bubble cap and similar towers, which require a pressure drop through the tower for vapor flow, the pressure differential between the condenser and heat source, e. g. reboiler, may be of the order of 30–90 millimeters of mercury. It is thus manifest that such towers are not ideal for use in the distillation of heat-sensitive materials.

My distillation vessel comprises a series of chambers or sections in each of which a pool of liquid is maintained which overflows into the chamber next below. This, of course, is also true of the conventional tray tower, but there the similarity ends, for in my vessel the necessary sub-division of the liquid to permit of its being efficiently contacted by the vapor is not brought about by the vapor itself but mechanically through the use of sprays positioned in each chamber above the pool of liquid therein, the liquid for the sprays being supplied from the pool by means of pumps. In my vessel, there is no liquid head for the vapor to overcome as in the case of the conventional distillation tower comprising a series of trays each carrying a substantial level of liquid. It is chiefly because of this liquid head that a large pressure drop is necessary in tray-equipped towers.

I shall describe my invention with the aid of the accompanying drawings illustrating a preferred embodiment thereof. In the drawings:

Figure 1 is a broken sectional elevation of the distillation vessel which will be seen as compartmented in character and as disposed substantially horizontally, the required deviation from the horizontal being only such as necessary to provide for liquid flow;

Figure 2 is a section on line 2—2 of Figure 1;

Figures 3 and 4 are detailed views of a nozzle to be hereinafter described;

Figure 5 is a section on line 5—5 of Figure 1;

Figure 6 is a section on line 6—6 of Figure 5, the view conforming to Figure 1;

Figure 7 is a section on line 7—7 of Figure 5;

Figure 8 is a section on line 8—8 of Figure 6; and

Figure 9 is a section on line 9—9 of Figure 1.

Referring to Figure 1, the numeral 10 denotes a cylindrical casing mounted by means of lugs 11 (see also Figure 9) on a suitable supporting structure, not shown, which may be of brick or steel construction, for example, the casing being provided with end members 12 and 13, shown as bolted to the casing through flanges 14 and 15, respectively, end member 12 having a flange 16 complementary with respect to flange 14 and end member 13 having a flange 17 complementary with respect to flange 15. In operation of the vessel, a vapor outlet line, not shown, is secured to end member 13 through flange 18 while a header plate, not shown, is fastened to end member 12 through flange 19. Also in operation, a liquid discharge line extending to a reboiler, not illustrated as it may be of conventional construction, is connected to a connection 20 associated with end member 12, the return line of the reboiler being connected to a connection 20a similar in construction to connection 20 and also associated with end member 12. Elements 21 and 22 at opposite ends of the casing are pressure gauges. A connection 23 at the vapor line end of the casing is adapted to be connected with a liquid reflux line.

Positioned in spaced relation along the bottom of the casing are connections 24 connecting through flange unions 25 with lines 26 extending to pumps 27 powered by motor 28, separated from the system as by a simple refrigerator-type seal, through shaft 29 carrying gears 30 meshing with complementary gears on the impeller shafts of the pumps. The delivery sides of the pumps 27 are connected to the casing 10 through connections 36 via line 31 and lines 32 and 33, provided with valves 34 and 35 respectively. Connections 36 may be secured to the casing, as may be the other connections, by welding. Lines 31 are conveniently connected to lines 32 and 33 and lines 32 and 33 are conveniently connected to connections 36 by flange unions as shown. Flange unions may also be employed, as indicated, to join the sections forming these lines.

Within the casing three compartments, or sections are delineated by entrainment eliminators 37 mounted on weirs 38 and secured to the top of the casing as by a plurality of cap screws, the support provided by the weirs 38 being strengthened by brackets 39 (see Figures 6 and 8).

Within each compartment and suitably joined as through the use of ferrules to each of lines 32 and 33, these lines being connected mediately to the delivery sides of the pumps, is a manifold spray device 40 comprising a plurality of spray nozzles 40a, the preferred arrangement of which is illustrated by Figure 2. Feed to the vessel is shown as to the center compartment through line 41.

Connection 24, detailed by Figures 3 and 4, each comprise a vane member 42 which extends slightly upwardly of the floor of the casing. The vane member may be seated in notches cut in a ring 42a attached, as by spot welding, to the walls of the connection.

Entrainment eliminators 37, detailed by Figures 5-7, comprise strips 43 which trace a zigzag course as best seen from Figure 7, and which are secured in parallel within a surrounding cage member 44. Tack welding may be employed to fasten the strips to the cage member 44, which is provided with lugs 45 through which the screws securing the eliminators to the casing pass. Blanks 46 are inserted in the spaces between the cage member 44 and the outermost of the strips 43, while a baffle 47 is secured, most suitably by tack welding, to the base portion of the cage member forwardly and slightly upwardly of the weirs 38 relative to the vapor line end of the vessel, the baffle in coaction with the weir serving to provide a liquid seal. Each of the strips 43 is suitably notched to straddle the baffle.

In operation of the system, as should by now be clear, charge stock, reflux condensate, and reboiled "bottoms" are continuously introduced into the vessel via lines 41, 23, and 20a, respectively, while liquid is continuously withdrawn from each of the pools formed by the weirs 38, the pools being indicated in Figure 1 by dotted lines, by pumps 27 and forced via lines 31, 32, and 33 through the spray nozzles affixed to the manifolds 40. Vapor entering a compartment contains little entrained liquid by virtue of the entrainment eliminators 37. All of the vapor leaving a compartment must pass through the entrainment eliminator between that compartment and the compartment next above since the liquid seal provided by the baffles 47 prevents vapor from passing through the openings between the base portion of the cage members 44 and the overflow lip of the weirs. The flow of liquid through these openings, of course, is continuous. Vane members 42 within the connections 24 serve, by preventing vortexes due to the low liquid level, to minimize the amount of vapor withdrawn by the pumps. As the vapor proceeds toward the upper end of the vessel it comes into intimate contact with liquid progressively leaner in higher boiling material and progressively richer in lower boiling material. Equilibrium between liquid and vapor is substantally complete in each chamber.

It is to be understood that the system, as described, is subject to considerable modification without departing from the scope of my invention. Thus, for example, reciprocating pumps, separately powered, may be substituted for the centrifugal pumps illustrated, or entrainment eliminators of a different type than those shown may be used. Where maximum jet effect from the spray nozzles is desired, as where it is desired to operate under conditions where the vapors must overcome a rising absolute pressure, the spray manifolds, shown in Figure 1 as facing end member 12, may be turned about to face the line of vapor flow. In some instances, it may be advantageous to employ adjustable spray nozzles or nozzles of different sizes with the larger nozzles facing the vapor exit line.

The number of compartments or chambers in the vessel may be varied depending upon the particular separation or the degree of separation sought to be accomplished. Although I generally introduce the feed into one of the center compartments, this, of course, is not essential. Nor is it essential that the feed be introduced as a liquid, the vessel being operable with a vapor feed. It is also possible by using eliminators and collectors of a different type to dispose the vessel vertically. In such arrangement the spray contacts the vapor over the full cross section of the tower, whereas in the horizontal arrangement this is not necessarily so.

The conditions under which the vessel is operated will, of course, like the number of compartments, vary depending upon the material being distilled and the purity desired in the product. In separating dichlorostyrenes of a purity adapting them for use in the manufacture of synthetic rubbers and plastic compositions from admixtures with chloroethyl dichlorobenzenes, I contemplate using a vessel comprising about 30 chambers with charging of the admixture as a liquid preheated to a temperature approximating that in the chamber, advantageously the center chamber, into which it is introduced. The feed liquid may contain, for example, 25% of dichlorostyrene and 75% of chloroethyl dichlorobenzene and, where this is the case, the atomized liquid:vapor ratio maintained in each chamber may be of the order of 5 to 1. In such operation the distillation may be so conducted that the vapor reaching the condenser contains in excess of 99% dichlorostyrene. This would require return to the vessel as reflux of from about 70%-75% of the condensate. Under the indicated conditions the material in the reboiler would contain approximately 98% chloroethyl dichlorobenzene, 1% dichlorostyrene and 1% polymerization products.

I claim:

A distillation vessel comprising a cylindrical casing inclined upwardly to provide for liquid flow downwardly therethrough, means at the upper end of the casing for securing a vapor outlet line thereto, means at the lower end of the casing for securing a liquid discharge line thereto, a plurality of entrainment eliminators transversely mounted in said cylindrical casing for delineating a series of compartments, a weir positioned below each of said eliminators for maintaining a pool of liquid upwardly thereof, a baffle depending into said pool of liquid from its respective eliminator to provide a liquid seal between adjacent upper and lower compartments thereby directing the flow of all of the vapor upwardly through said eliminators while allowing continuous downward flow of the liquid, a spray manifold disposed within each compartment, means for withdrawing liquid from each compartment and supplying said liquid to its respective spray manifold, means for introducing charge stock into said cylinder, and means for introducing reflux condensate into the upper end of said cylinder.

JUDSON S. SWEARINGEN.

REFERENCES CITED

The following references are of record in the file of this patent:

UNITED STATES PATENTS

| Number | Name | Date |
| --- | --- | --- |
| 1,314,802 | Hechenbleikner | Sept. 2, 1919 |
| 1,868,886 | Collins | July 26, 1932 |
| 2,088,691 | Dill | Aug. 3, 1937 |
| 2,152,251 | Gay | Mar. 28, 1939 |
| 2,183,943 | Reich | Dec. 19, 1939 |
| 2,299,130 | Dill | Oct. 20, 1942 |

FOREIGN PATENTS

| Number | Country | Date |
| --- | --- | --- |
| 120,304 | Great Britain | Nov. 7, 1918 |